(12) United States Patent
Goren et al.

(10) Patent No.: US 6,297,592 B1
(45) Date of Patent: Oct. 2, 2001

(54) MICROWAVE VACUUM TUBE DEVICE EMPLOYING GRID-MODULATED COLD CATHODE SOURCE HAVING NANOTUBE EMITTERS

(75) Inventors: Yehuda Goren, Palo Alto, CA (US); Sungho Jin, Millington, NJ (US); Gregory P Kochanski, Dunellen, NJ (US); Wei Zhu, Warren, NJ (US)

(73) Assignees: Lucent Technologies Inc., Murray Hill, NJ (US); Teledyne Technologies, Inc., Los Angeles, CA (US)

( * ) Notice: Subject to any disclaimer, the term of this patent is extended or adjusted under 35 U.S.C. 154(b) by 0 days.

(21) Appl. No.: 09/631,890

(22) Filed: Aug. 4, 2000

(51) Int. Cl.[7] ................................................ H01J 23/04
(52) U.S. Cl. .......................... 315/3.5; 315/5.18; 313/45
(58) Field of Search ........................... 315/3, 3.5, 5, 5.18, 315/5.19, 5.33; 313/45, 309, 311, 351

(56) References Cited

U.S. PATENT DOCUMENTS

| | | | |
|---|---|---|---|
| 4,453,108 | * 6/1984 | Freeman, Jr. | 315/5.18 |
| 5,680,011 | * 10/1997 | Makishima | 315/3 |
| 5,796,211 | * 8/1998 | Graebner et al. | 315/3.5 |
| 5,872,422 | 2/1999 | Xu et al. | 313/311 |
| 5,935,639 | 8/1999 | Sullivan et al. | 427/78 |
| 5,977,693 | 11/1999 | Nakamoto et al. | 313/45 |
| 6,114,808 | * 9/2000 | Takahashi | 315/3.5 |

OTHER PUBLICATIONS

A. S. Gilmour, Jr., Microwave Tubes, Artech House, pp. 191–313 (1986).
Ren et al., Science, vol. 282, 1105 (1998).
Fan et al., Science, vol. 283, 12 (1999).
Rinzler et al., Science, vol. 269, 1550 (1995).
DeHeer et al., Science, vol. 270, 1179 (1995).
Saito et al., Jpn. J. Appl. Phys., vol. 37, L346 (1998).
Wang et al., Appl. Phys. Lett., vol. 70, 3308 (1997).
Saito et al., Jpn. J. Appl. Phys., vol. 36, L1340 (1997).
Wang et al., Appl. Phys. Lett., vol. 72, 2912 (1998).
Bonard et al., Appl. Phys. Lett., vol. 73, 918 (1998).
U.S. patent application Ser. No. 09/236966 filed Jan. 25, 1999.
U.S. patent application Ser. No. 09/236933 filed Jan. 25, 1999.
U.S. patent application Ser. No. 09/296572 filed Apr. 22, 1999.
U.S. patent application Ser. No. 09/351537 filed Jul. 12, 1999.
U.S. patent application Ser. No. 09/512873 filed Feb. 25, 2000.
U.S. patent application Ser. No. 09/376457 filed Aug. 18, 1999.

* cited by examiner

Primary Examiner—Don Wong
Assistant Examiner—Wilson Lee
(74) Attorney, Agent, or Firm—Scott Rittman

(57) ABSTRACT

An improved gridded microwave tube is provided, the tube containing a cold cathode, an anode, and a grid located between the anode and cathode. In one embodiment, the cold cathode has a refractory metal substrate and carbon nanotube emitters, the emitters having a diameter of 1 to 300 nm and a length of 0.05 to 100 μm. The grid-cathode spacing is 1 to 100 μm, the grid contains apertures having a maximum dimension of 0.5 to 100 μm, and the grid thickness is 0.5 to 100 μm. Emission from the cathode directly onto the grid material itself, which undesirably heats the grid, is reduced by either (a) the presence of a shadow mask between the grid and the emitters or (b) selective formation of the emitters in locations that correspond to the grid apertures. The microwave tube operates at a frequency of greater than 0.5 GHz, advantageously greater than 2 GHz.

17 Claims, 5 Drawing Sheets

US 6,297,592 B1

MICROWAVE VACUUM TUBE DEVICE EMPLOYING GRID-MODULATED COLD CATHODE SOURCE HAVING NANOTUBE EMITTERS

BACKGROUND OF THE INVENTION

1. Field of the Invention

The invention relates to microwave vacuum tube devices, in particular tubes modulated by a proximately positioned grid structure, i.e. gridded tubes.

2. Discussion of the Related Art

Microwave vacuum tube devices, such as power amplifiers, are essential components of many modern microwave systems including telecommunications, radar, electronic warfare and navigation systems. While semiconductor microwave amplifiers are available, they generally lack the power capabilities required by most microwave systems. Microwave vacuum tube amplifiers, in contrast, can provide higher microwave power by orders of magnitude. The higher power levels of vacuum tube devices are the result of the fact that electrons can travel at a much higher velocity in a vacuum with much less energy losses than in a solid semiconductor material. The higher speed of electrons permits a use of the larger structure with the same transit time. A larger structure, in turn, permits a greater power output, often required for efficient operations.

Microwave tube devices typically operate by introducing a beam of electrons into a region where the beam interacts with an input signal, and deriving an output signal from the thus-modulated beam. See, e.g., A. S. Gilmour, Jr., Microwave Tubes, Artech House, 1986, 191–313. Microwave tube devices include gridded tubes (e.g., triodes, tetrodes, and klystrodes), klystrons, traveling wave tubes, crossed-field amplifiers and gyrotrons. All require a source of emitted electrons. For example, a conventional klystrode 10 is shown in FIG. 1. The klystrode contains 5 main elements—a cathode 12, a grid 14, an anode 16, a tail pipe 18, and a collector 20. The whole tube is optionally placed in a uniform magnetic field for beam control. In operation, a RF voltage is applied between the cathode 12 and grid 14 by one of several possible circuit arrangements. For example, it is possible for the cathode to be capacitively coupled to the grid or inductively coupled with a coupling loop into an RF cavity containing the grid structure. The grid 14 regulates the potential profile in the region adjacent the cathode, and is thereby able to control the emission from the cathode.

The resulting density-modulated (bunched) electron beam 22 is accelerated toward the apertured anode 16 at a high potential. The beam 22 passes by a gap 19, called the output gap, in the resonant RF cavity and induces an oscillating voltage and current in the cavity. RF power is coupled from the cavity by an appropriate technique, such as inserting a coupling loop into the RF field within the cavity. Finally, most of the beam passes through the tail pipe 18 into the collector 20. By depressing the potential of the collector 20, some of the dc beam power can be recovered to enhance the efficiency of the device. Demonstrated efficiency of such devices is relatively high, e.g., reaching 50% at 1 GHz, and the typical gain is about 25 dB at 1 GHz.

The usual source of electrons for such microwave tube devices is a thermionic emission cathode, which is typically formed from tungsten that is either coated with barium or barium oxide, or mixed with thorium oxide. Thermionic emission cathodes must be heated to temperatures around 1000° C. to produce sufficient thermionic electron emission current, e.g., on the order of amperes per square centimeter. (As used herein, thermionic cathode indicates a cathode that must be heated to at least 800° C. to provide measurable emission.) The necessity of heating thermionic cathodes to such high temperatures creates several problems. For example, the heating limits the lifetime of the cathodes, introduces warm-up delays, requires bulky auxiliary equipment for cooling, and tends to interfere with modulation of emission in gridded tubes. The limited lifetime is due to the fact that the high operating temperatures cause constituents of the cathode, such as the barium or barium oxide, to evaporate from the hot surface. It is possible for the evaporated barium or barium oxide to then deposit onto the grid, which causes undesirable grid emission that essentially renders the device ineffective. Moreover, once the barium is depleted from the cathode, the cathode (and hence the tube) no longer functions. Many thermionic vacuum tubes therefore have operating lives of less than a year. The delay in emission is due to the time required for temperature ramp-up, and delays as long as four minutes are not uncommon. Such delays are unacceptable for many applications.

For gridded tubes, such as the klystrode 10 of FIG. 1, the high temperature environment near the grid electrode tends to introduce thermally induced geometrical and/or dimensional instability that changes the cathode-grid spacing, e.g., due to thermal expansion mismatch or structural sagging. These changes to the spacing tend to significantly interfere with the ability of the grid to modulate the cathode emission, and thus interfere with the overall operation of the gridded tube. Moreover, there is a certain minimum cathode-grid spacing that must be maintained, to ensure that such dimensional changes do not result in contact between the cathode and grid. Because of this minimum spacing requirement, it is not possible to move the cathode and grid closer together in order to decrease the cathode-grid transit time, which would in turn increase the maximum operating frequency of the device. For this reason, the frequency of gridded tubes with thermionic cathodes is limited.

Thus, there is a need for an improved electron source for microwave tube devices, particularly gridded tubes, which avoids problems of conventional devices and is able to reduce transit times.

SUMMARY OF THE INVENTION

The invention relates to an improved gridded-type microwave tube, in which a cold cathode containing carbon nanotube emitters is used. Use of the cold cathode avoids the problems encountered with thermionic cathodes, and allows the grid and cathode spacing to be substantially reduced, thereby reducing transit time of the electrons. In fact, a microwave tube of the invention generally exhibits a transit time at least 2× shorter than a similar tube having a thermionic cathode. And the operating frequency of a microwave tube of the invention is generally enhanced at least 2× compared to a similar tube having a thermionic cathode.

The gridded tube of the invention contains a cold cathode, an anode, and a grid located between the anode and cathode, such as shown by the conventional klystrode of FIG. 1. In one embodiment, the cold cathode has a refractory metal substrate and carbon nanotube emitters. The nanotube emitters have a diameter of 1 to 300 nm and a length of 0.05 to 100 μm (length indicating the actual length of the nanotubes regardless of their geometrical configuration). Advantageously, the height of the nanotubes from the cathode substrate is relatively uniform, e.g., at least 90% of the nanotubes have a height within about 20% of the average height. The grid-cathode spacing is 1 to 100 μm, the grid contains apertures having a maximum dimension of 0.1 to 100 μm, and the grid thickness is 0.1 to 50 μm. Emission from the cathode directly onto the grid material itself, which undesirably heats the grid, is reduced by either (a) the presence of a shadow mask on the emitters or (b) selective formation of the emitters in locations that correspond to the grid apertures. The microwave tube operates at a frequency of greater than 0.5 GHz, advantageously greater than 2 GHz.

DETAILED DESCRIPTION OF THE INVENTION

Figure 1:
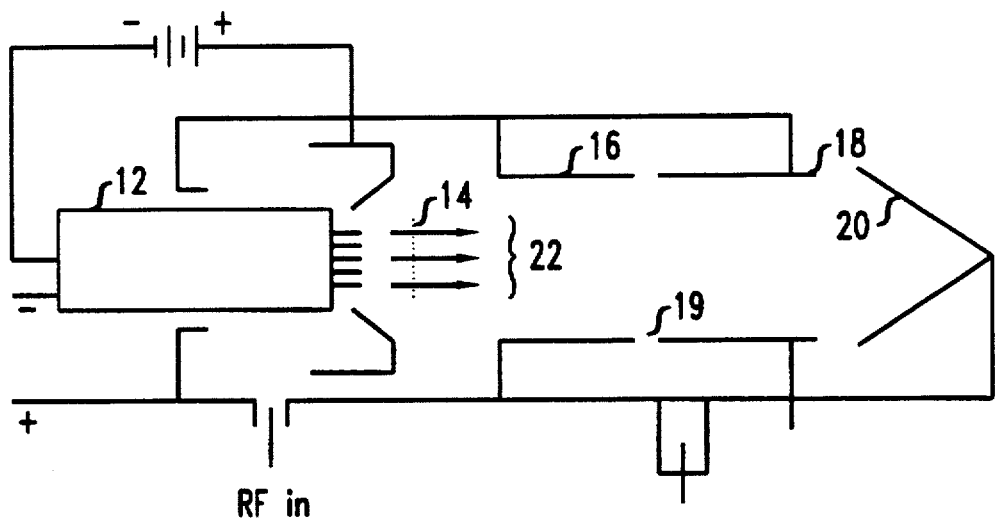
FIG. 1 illustrates a conventional klystrode type of microwave tube.

The invention provides an improved gridded microwave tube that uses a cold cathode having carbon nanotube emitters. The cold cathodes are capable of fast, nearly instantaneous, room temperature emission when an electric field is applied. The cold cathode allows the grid to be positioned very close to the cathode, providing direct modulation of the electron beam signals (by the grid) with substantially reduced transit time. The transit time in the inventive device is generally shortened by a factor of at least 2 compared with a similar tube structure containing a thermionic cathode. The operating frequency of the inventive microwave tube is also typically enhanced by a factor of at least 2 compared with a similar tube structure containing a thermionic cathode. In particular, the cathode-grid gap in the inventive tube device is relatively small, typically 1 to 100 μm, advantageously 1 to 20 μm, whereas gaps in gridded tubes containing thermionic cathodes generally are greater than 100 μm.

Carbon nanotubes are attractive as field emitters because their high aspect ratio (>1,000), one-dimensional structure, and small tip radii of curvature (~10 nm) tend to effectively concentrate the electric field. In addition, the atomic arrangement in a nanotube structure imparts superior mechanical strength and chemical stability, both of which make nanotube field emitters robust and stable. It is possible to prepare carbon nanotubes by a variety of techniques, including carbon-arc discharge, chemical vapor deposition via catalytic pyrolysis of hydrocarbons, laser ablation of a catalytic metal-containing graphite target, or condensed-phase electrolysis. Depending on the method of preparation and the specific process parameters, the helicity and the diameter of the tubules, the nanotubes can be produced multi-walled, single-walled, or as bundles of single-walled tubules, and can adopt various shapes such as straight, curved, planar-spiral and helix. Carbon nanotubes are typically grown in the form of randomly oriented, needle-like or spaghetti-like powders. However, oriented nanotube structures are also possible, as reflected in Ren et al., *Science*, Vol. 282, 1105, (1998); Fan et al., *Science*, Vol. 283, 512 (1999).

Carbon nanotube emitters are discussed, for example, in Rinzler et al, *Science*, Vol. 269, 1550 (1995); De Heer et al., *Science*, Vol. 270, 1179 (1995); Saito et al., *Jpn. J. Appl. Phys.*, Vol. 37, L346 (1998); Wang et al., *Appl. Phys. Lett.*, Vol. 70, 3308, (1997); Saito et al., *Jpn. J. Appl. Phys.*, Vol. 36, L1340 (1997); Wang et al., *Appl. Phys. Lett.*, Vol. 72, 2912 (1998); and Bonard et al., *Appl. Phys. Lett.*, Vol. 73, 918 (1998). Techniques for forming nanotube field emitter structures, with both oriented and non-oriented nanotubes structures are also described in patent applications Ser. Nos. 09/236966, 09/236933, 09/296572, 09/351537, 09/512873, and 09/376457, the disclosures of which are hereby incorporated by reference.

As reflected in these techniques, it is possible to form carbon nanotube emitters on substrate by either in-situ growth or post-deposition spraying techniques. For in-situ growth, the substrate is generally placed in a chemical vapor deposition chamber, and pre-coated with a thin layer (e.g., 1–20 nm thick) of catalyst metal such as Co, Ni or Fe (or formed from such a metal). The gas chemistry is typically hydrocarbon or carbon dioxide mixed with hydrogen or ammonia. Depending on specific process conditions, it is possible to grow the nanotubes in either an aligned or random manner. Optionally, a plasma assisted chemical vapor deposition technique is used to grow highly aligned nanotubes on the substrate surface, as disclosed in coassigned patent application Ser. No. 09/376457, supra. For non-flat cathode surfaces, such a plasma assisted CVD technique is particularly useful for growing conformally-aligned nanotubes. Other techniques are also possible.

In a typical post-deposition technique, reflected, for example, in patent application Ser. No. 09/296572, supra, pre-formed and purified nanotube powders are mixed with solvents and optionally binders (which are pyrolized later) to form a solution or slurry. The mixture is then disposed, e.g., screen printed or dispersed by spray, spin-on, or electrophoresis, onto a substrate, the substrate optionally containing carbon dissolving elements (e.g., Ni, Fe, Co) or carbide forming elements (e.g., Si, Mo, Ti, Ta, Cr), to form a desired emitter structure. Annealing in either air, vacuum or inert atmosphere is followed to drive out the solvent, leaving a nanotube emitter structure on the substrate. And where the carbon dissolving or carbide forming elements are present, annealing promotes improved adhesion. Other post-deposition techniques are also possible.

The diameter of the field-emitting nanotubes is 1 to 300 nm, advantageously 1 to 100 nm. The length of the nanotubes is 0.05 to 100 μm, advantageously 0.5 to 20 μm. To maintain the small gap between the cathode and the grid, and thereby achieve a reduced transit time and a higher operating frequency, the nanotubes advantageously exhibit a relatively uniform height, e.g., at least 90% of the nanotubes have a height that varies no more than 20% from the average height.

Because of the nanometer scale of the nanotubes, the nanotube emitters provide many potential emitting points, typically more than $10^9$ emitting tips per square centimeter assuming a 10% area coverage and 10% activated emitters from 30 nm (in diameter) sized nanotubes. The emitter site density in the invention is typically at least $10^3/cm^2$, advantageously at least $10^4/cm^2$ and more advantageously at least $10^5/cm^2$. The nanotube-containing cathode requires a turn-on field of less than 2 V/μm to generate 1 nA of emission current, and exhibits an emission current density of at least 0.1 A/cm$^2$, advantageously at least 0.5 A/cm$^2$, at an electric field of 5 to 50 V/μm.

It is desirable to have a gate structure with as many gate apertures as possible, both for maximum emission efficiency and to minimize the heating effect caused by electrons intercepted by the gate grids. The grid in the microwave tube of the invention is made of a conductive metal, and has a perforated, mesh, or apertured structure that draw the emitted electrons yet let the electrons pass to the anode. An apertured grid structure is particularly useful. Such an apertured grid structure is prepared by photolithography or other known patterning techniques. The apertures have an average maximum dimension of 0.5 to 100 µm, advantageously 1 to 100 µm, more advantageously 1 to 20 µn, and are able to be formed in a variety of shapes. (Maximum dimension indicates the largest distance across the aperture, e.g., diameter for a circular aperture.) In the case of a fine wire mesh screen, the wire diameter is typically 5 to 50 µm and the average maximum dimension is similarly 0.5 to 100 µm, advantageously 1 to 100 µm, more advantageously 1 to 20 µm.

The grid is typically separated from the cathode either by suspending the grid in the device or by placing one or more electrically insulating spacers, e.g., $Al_2O_3$, between the grid and cathode. The dimensional stability of the grid, particularly maintenance of the gap between the cathode and the grid, is important, as noted above. The grid is typically formed from a mechanically strong, high melting point (at least 1600° C.), low thermal expansion metal such as a refractory or transition metal, e.g., Mo, W, Ta, Hf, Ni, or Cr. The use of relatively strong and creep-resistant ceramic materials such as highly conductive oxides, nitrides, and carbides is also possible (conductive or conductor indicating a material having an electrical resistivity less than 5000 µΩ-cm). The grid is desirably configured to have as much mechanical rigidity as possible. The typical thickness of the grid conductor, i.e., when an apertured grid is used, is 0.1 to 50 µm, typically 2 to 50 µm.

In one embodiment, assembly of the grid to the cathode structure uses only two parts. The first part is an insulating ring (or three or more insulating pads) that is secured directly onto the emitters or onto the cathode substrate. The insulating ring is formed from any suitable electrically insulating material, e.g., ceramics. They are advantageously of sufficient thickness such that surface breakdown is prevented—typically offering greater than $3 \times 10^{-5}$ cm/Volt (as measured along the surface from the cathode to the grid). The thickness of the insulating ring is able to be reduced if the rings' upper and/or lower surface is properly textured. For example, grooves or bumps on the ring surface will lengthen the surface breakdown path, thereby increasing the breakdown voltage and/or allowing reduced ring widths.

The second part of the assembly is a metal support ring to which the periphery of the grid is attached, e.g., welded. The metal ring is secured directly onto the insulating ring or spacers. The metal support ring supports the grid, and also protects the upper surface of the insulating ring from accidental deposition of conductive material, e.g., from deposition of nanotubes in an embodiment in which the emitters are formed after the grid is secured to the cathode. The support ring is typically a metal such as molybdenum or stainless steel, but it is also possible to use ceramic rings. Such ceramic rings tend to allow tighter machining tolerances, and also will be more likely to have thermal expansion coefficients more closely matched to the insulating pad. Additionally, ceramics allow a longer insulating path over which it is possible to drop the emitter-grid voltage.

Excessive heating of the grid structure due to impacts of electrons will tend to induce expansion and sagging of the grid, which will in turn change the spacing between the cathode and grid, the electric field, and thus the emission characteristics. Moreover, when a grid is substantially expanded due to thermal effects, it is possible that a portion of the grid will even touch the cathode, causing an electric short and catastrophic failure of the entire device. To reduce such grid heating, the gridded tube of the invention uses either a shadow grid directly placed on the cathode surface or selective formation of the emitters on the cathode surface. The shadow grid is identical to the structure of the active grid, and covers or blocks the emitters directly underneath the active grid material, thereby preventing emitting electrons from impacting the grid. One technique for forming the shadow grid is to align, place and optionally bond a structure identical to the active grid onto the nanotube cathode surface.

Selective formation of the nanotube emitters is performed by any suitable technique. One technique is to spray a pre-formed nanotube suspension through a grid structure onto the substrate, such that the resulting cathode will have emitters formed primarily under the grid apertures. Another technique is to deposit a catalyst metal for nanotube formation in a pattern corresponding to the grid apertures, e.g., by sputter-deposition through a shadow mask. Nanotubes are then formed on the patterned catalyst metal by a chemical vapor deposition process, as discussed above.

The carbon nanotubes are generally attached or formed on the surface of the cathode substrate before the grid structure is assembled. The cathode substrate typically contains an electrical conductor such as a metal, doped semiconductor, or conductive oxide, carbide, or nitride (conductor or conductive has the same meaning indicated above). Advantageously, particularly for high current operation, the substrate contains a refractory metal with a high melting temperature (i.e., at least 1600° C.), e.g., W, Mo, Ta, Hf, or Zr. It is possible for the surface of the cathode substrate to be flat, or curved (e.g., concave), as discussed in more detail below.

Figure 2A:
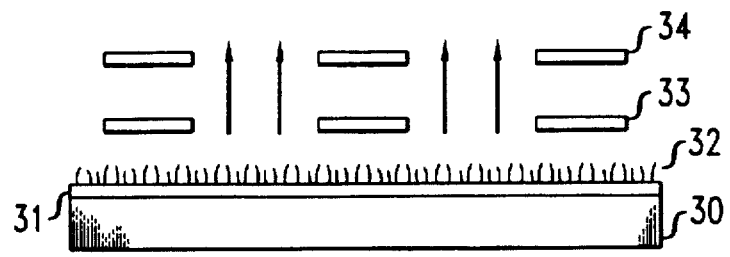
FIGS. 2A to 2C illustrate cold cathode and grid configurations according to aspects of the invention.

FIG. 2A illustrates a cathode and grid structure according to one embodiment of the invention. The surface of the cathode substrate 30 contains a pre-coated layer 31 of a carbon dissolving or carbide forming element, e.g., sputtering or electrochemically plating a thin iron layer. (As used herein, cathode substrate includes a substrate and any layers formed thereon.) Pre-formed nanotubes 32 are then spray coated on the substrate, typically in a suspension, and the structure is then heat treated to induce diffusional reaction of nanotubes with iron to promote bonding of the nanotubes to the substrate 30. A shadow grid 33 is placed directly on the nanotubes 32 to block the emission from under the shadow grid and thereby reduce unwanted electron bombardment of the grid. The grid 34 is then aligned with the shadow grid and fixed in position.

Figure 2B:
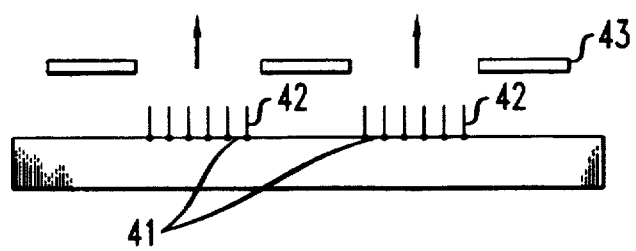

Another embodiment of a cathode and grid structure is illustrated in FIG. 2B. In this embodiment, the cathode substrate 40 contains a patterned catalyst material 41, and the nanotubes are grown directly on the catalyst material 41 by a CVD process. The catalyst material 41 is patterned to correspond to the apertures of the grid 43. Advantageously, a microwave or RF plasma enhanced CVD process, as discussed above, is used to provide aligned carbon nanotubes 42.

In CVD fabrication of nanotubes, it is possible to encounter some difficulty in forming nanotubes on a refractory metal substrate having a catalyst metal thereon. As reflected in FIG. 2C, for a refractory metal substrate 50, it is therefore advantageous to form a layer of silicon 51, e.g., a 1 to 100 nm thick layer formed by sputtering or evaporation, on the refractory metal substrate 50. The catalyst material 52 is then formed on the silicon, and the CVD nucleation and growth of nanotubes 53 is performed. The grid 54 is then provided.

The silicon layer appears to provide anchoring points for the growing nanotubes by creating a silicide of the catalyst material. To further improve the adhesion of the silicon layer to the refractory substrate, it is possible to provide an alloy containing both silicon and the refractory metal. Instead of forming such an alloy layer, it is also possible to deposit a layer having a composition gradient, such as by using a two-target sputtering approach and initially making the layer rich in the refractory metal (e.g., at least 70 wt. %) with a gradual transition to a silicon-refractory metal mixture and then to a silicon-rich composition (e.g., at least 70% in weight).

Figure 2C:
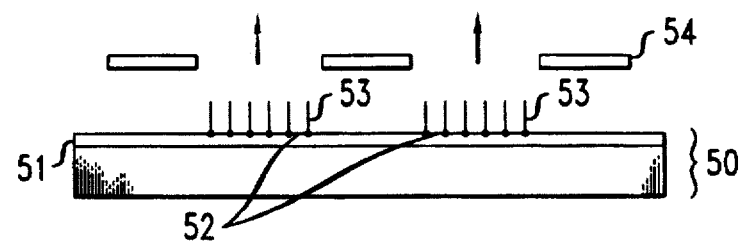
Figure 3A:
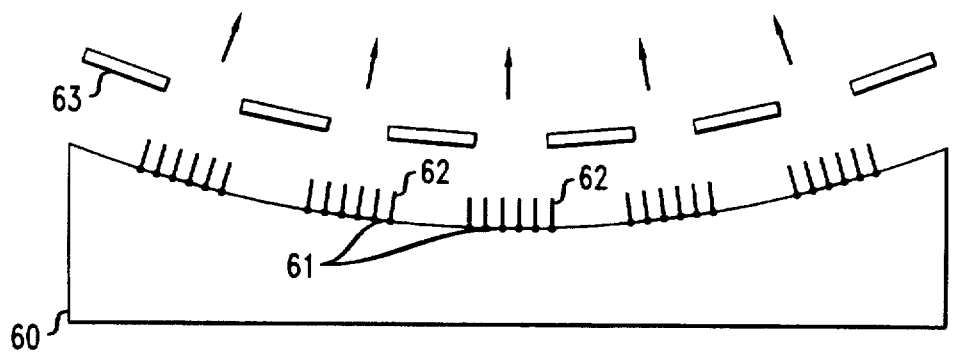
FIGS. 3A and 3B illustrate cold cathode designs according to other aspects of the invention.
Figure 3B:
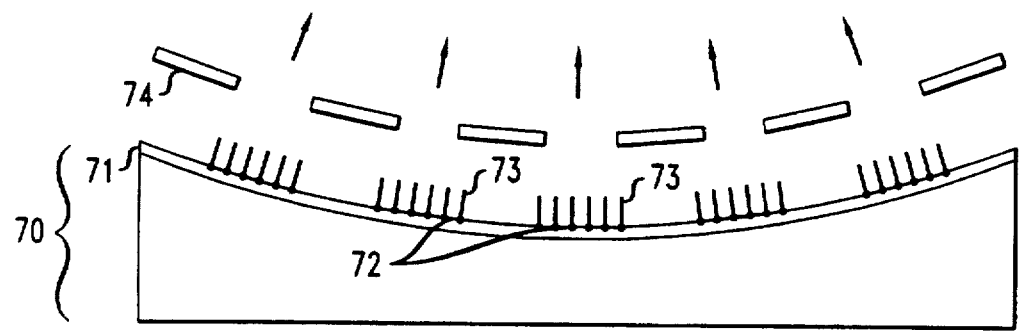

FIGS. 3A and 3B illustrate embodiments using curved cathode surfaces, which generally provide improved focusing of the electron beam in a gridded microwave tube. (The designs reflected in FIGS. 2A to 2C are applicable to such curved surfaces.) In the embodiment of FIG. 3A, a cathode substrate 60 having a curved surface is provided and contains patterned regions of a catalyst material 61. Nanotubes 62, advantageously aligned, are formed on the catalyst by a CVD technique, and a grid structure 63 is then provided. In the embodiment of FIG. 3B, a refractory metal cathode substrate 70 with a curved surface is provided, and contains a silicon layer 71. Regions of a catalyst material 72 are patterned on the silicon layer 71, and nanotubes 73, advantageously aligned nanotubes, are formed by a CVD technique on the catalyst material. A grid 74 is then provided, with the apertures arranged over the selectively formed nanotube emitters.

A slightly concavity of the cathode away from the grid is also able to compensate for some sagging of the grid. Specifically, the grid will tend to sag under the influence of electrostatic forces as voltage is applied between the grid and the cathode. It is possible, as noted above, for such sagging to contribute to damage or destruction of the tube. In addition, for a flat cathode surface, the electric field under the center of the grid will increase as the grid sags, because the same voltage is dropped across a smaller distance. This increased electric field will cause the field emitters under that portion of the grid to emit far more strongly than the emitters around the edge, resulting in a non-uniform emission. The concavity of the cathode is advantageously selected, therefore, to self-consistently match the grid shape at the operating voltage.

It is also possible to use a tensioned grid. The grid is attached to a support ring, as discussed above, such that the grid will be under tension at its normal operating temperature. This tension will tend to keep the grid flatter and will also inhibit sagging.

Figure 4A:
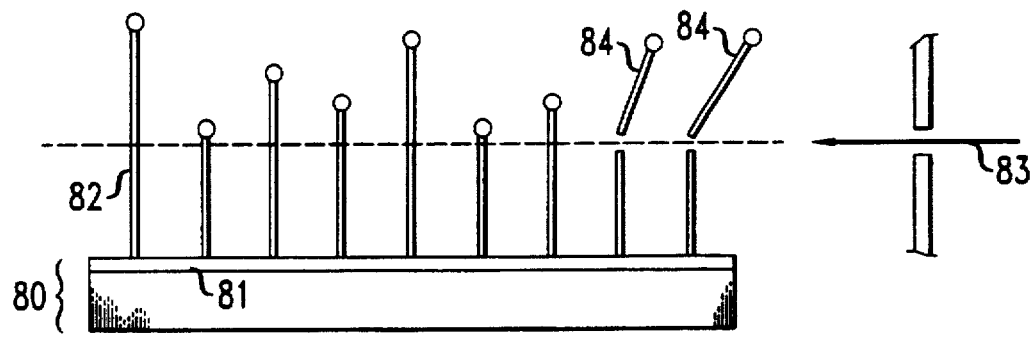
FIGS. 4A and 4B illustrate technique for forming emitter structures according to further aspects of the invention.

Excessive variation of the height of the nanotubes tends to cause some variation in the gap between the cathode emitting tips and the grid, and leads to undesired fluctuations in the local electric field. It is possible for any particularly long nanotubes to actually touch the grid and thereby cause an electrical short and failure of the device. Advantageously, the growth conditions are controlled to provide a relatively uniform height of the nanotubes, e.g., as in the plasma enhanced CVD technique noted above. In cases where the variation is greater than desired, however, it is possible to provide improved uniformity. One technique for providing more uniform nanotubes uses a high-energy beam such as a laser beam, an electron beam, an ion beam, or a gas plasma beam. (See patent application Ser. No. 09/236933.) It is possible to use a point source beam, a multiplicity of parallel beams, or a planar beam, either in a stationary mode or in a scanning mode of illumination. As reflected in FIG. 4A, the portions of carbon nanotubes 82 contacted by the beam 83 are evaporated, and the nanotubes 82 are truncated one after another as the beam 83 propagates through the nanotubes. (The nanotubes are formed on a catalyst layer 81 present in the substrate 80) A light vacuum suction or a gentle gas blow is typically used either during or after the truncating process in order to reduce the extent to which broken-off ends 84 are trapped in the remaining nanotube structure. It is also possible to sweep the beam from the upper ends of the nanotubes down to the desired height, such that the undesired portions of the nanotubes are substantially evaporated, instead of merely truncated. The beam energy depends on the nature of the beam, the size and density of nanotubes, and the mode of beam operation. For example, in the case of an excimer laser (such as an ArF laser), the desired energy is typically in the range of 0.1–100 milli Joule per pulse with a pulse duration of 1–100 nanoseconds, operated at 1–1000 Hz repetition rate.

Figure 4B:
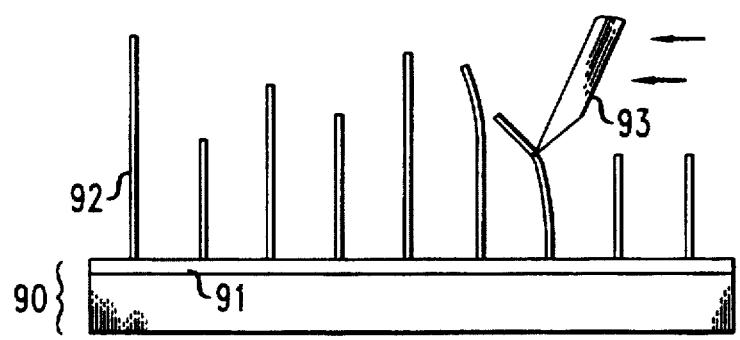

FIG. 4B illustrates an alternative technique for truncating carbon nanotubes, using oxygen and a temperature gradient. Substantially all forms of solid carbon burn in the presence of an oxygen-containing atmosphere at high temperature. In the technique reflected in FIG. 4B, the top portions of carbon nanotubes 92 (formed on a catalyst layer 91 of a substrate 90) are brought into contact with a hot blade 93 in an oxygen-containing atmosphere. The hot blade provides a temperature gradient near the top portions of the nanotubes, and those parts of the nanotube which reach a critical temperature, e.g., about 400° C. or higher, react with oxygen and are removed. The critical temperature depends on the oxygen partial pressure in the atmosphere, the time of contact between the hot blade and the carbon nanotubes, as well as the diameter of the each nanotube (or each bundle of nanotubes). The hot blade is formed from any suitable metallic or ceramic material, and is heated by any suitable means. The desired temperature of the blade tip which contacts the nanotube is at least 400° C., preferably at least 600° C.

The invention will be further clarified by the following example, which is intended to be exemplary.

EXAMPLE 1

Figure 5:
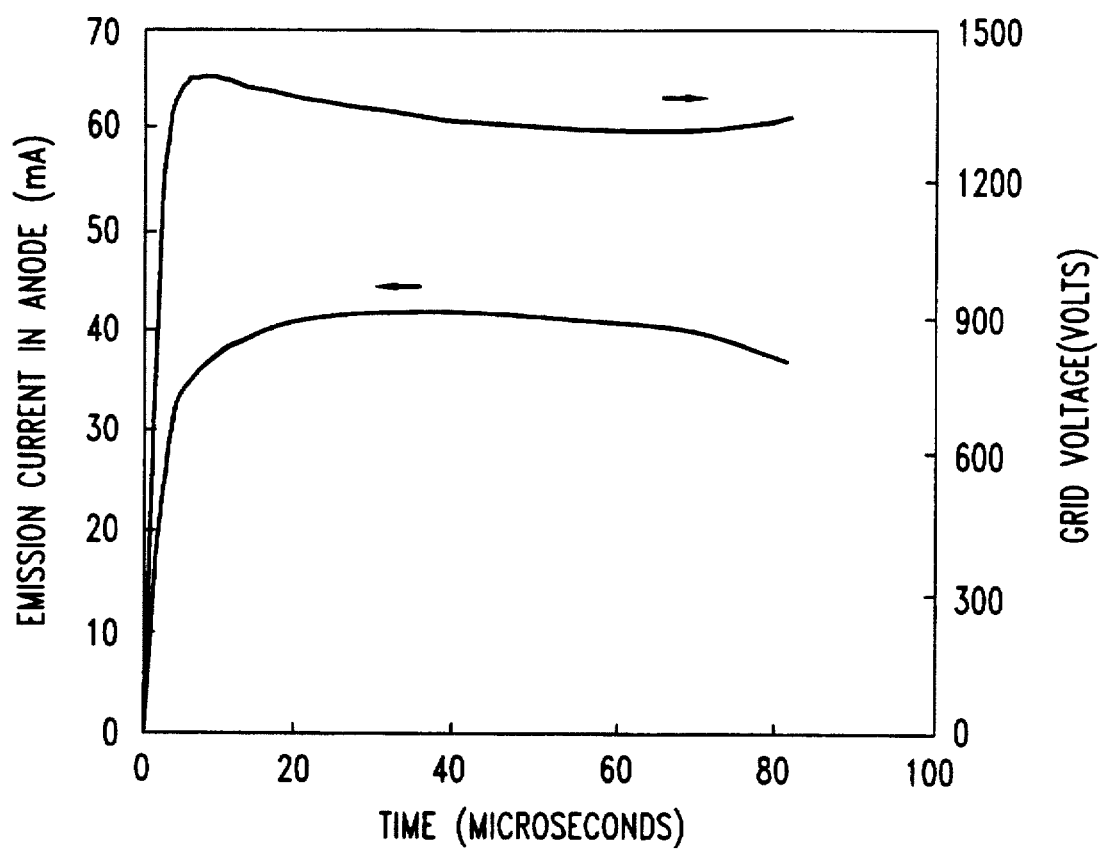
FIG. 5 shows the operation of a triode microwave vacuum tube configuration according to the invention.

Single-wall carbon nanotubes produced by a laser ablation technique were suspended in acetone in an ultrasonic bath. The suspension was sprayed onto a molybdenum cathode surface having a diameter of about 5.5 mm, on which had been sputtered an approximately 1 μm thick iron film. The cathode was then annealed in vacuum ($10^6$ torr) at 800° C. for one hour. The field emitter was assembled in a triode configuration having a molybdenum grid mechanically secured 125 μm from a grounded nanotube field emitter cathode. The grid was formed of a wire mesh screen with about 25 μm diameter wires and square-shaped aperture openings of about 75 μm. A 6 KV anode was placed at a location about 5 mm from the grid. A voltage of 900V was applied to the grid, and the grid was pulsed at 1% duty with 80 microsecond long pulses. FIG. 5 illustrates the grid voltage trace as well as the electron beam currents that impinged on the anode. A total cathode current density, including the anode current and the grid current (the grid current is not shown in FIG. 5), of about 0.24 A/cm$^2$ was observed.

Other embodiments of the invention will be apparent to those skilled in the art from consideration of the specification and practice of the invention disclosed herein.

What is claimed is:

1. A system comprising a gridded microwave tube, the tube comprising:

a cold cathode comprising a substrate that comprises a conductive material and carbon nanotube emitters, wherein the nanotube emitters have a diameter of 1 to 300 nm and a length of 0.05 to 100 μm;

an anode; and a grid located between the anode and the cathode, wherein the grid-cathode spacing is 1 to 100 μm, wherein the grid comprises apertures having a maximum dimension of 0.5 to 100 μm, wherein the grid thickness is 0.1 to 50 μm, and wherein the grid is capable of modulating the intensity and frequency of electron emission from the cathode, wherein emission from the cathode directly onto the grid material is reduced by the presence of a shadow mask between the grid and the emitters or by selective formation of the emitters on the surface of the substrate, and wherein the microwave tube operates at a frequency of greater than 0.5 GHz.

2. The system of claim 1, wherein the nanotube emitters have a diameter of 1 to 100 nm and a length of 0.5 to 20 μm, wherein the grid-cathode spacing is 2 to 20 μm, wherein the grid apertures have a maximum dimension of 1 to 20 μm, and wherein the grid thickness is 2 to 50 μm.

3. The system of claim 1, wherein a first surface of the cathode substrate comprises a silicon layer, and wherein the emitters are formed on the first surface.

4. The system of claim 1, wherein a first surface of the cathode substrate comprises a carbide-forming or carbon-dissolving element, and wherein the emitters are formed on the first surface.

5. The system of claim 1, wherein a first surface of the cathode substrate comprises a mixture of the refractory metal and silicon, and wherein the emitters are formed on the first surface.

6. The system of claim 1, wherein the nanotube emitters exhibit a density of at least $10^3/cm^2$ on the first surface of the substrate.

7. The system of claim 1, wherein the microwave tube operates at a frequency greater than 2 GHz.

8. The system of claim 1, wherein the cathode requires a turn-on field of less than 2 V/μm to generate 1 nA of emission current, and exhibits an emission current density of at least 0.1 A/cm$^2$ at an electric field of 5 to 50 V/μm.

9. The system of claim 1, wherein the cathode exhibits an emission current density of at least 0.5 A/cm$^2$ at an electric field of 5 to 50 V/μm.

10. The system of claim 1, wherein the cathode substrate comprises a flat surface on which the emitters are formed.

11. The system of claim 1, wherein the cathode substrate comprises a concave surface on which the emitters are formed.

12. The system of claim 1, wherein the conductive material comprises a refractory metal having a melting point of at least 1600° C.

13. The system of claim 1, wherein the grid comprises a refractory or transition metal having a melting point of at least 1600° C.

14. The system of claim 1, wherein at least 90% of the nanotubes have a height from the cathode surface that varies no more than 20% from the average height.

15. The system of claim 1, wherein the grid is secured to the cathode by an insulating ring or insulating spacers located on the cathode surface and a metal ring located on the insulating ring or insulating spacers, wherein the periphery of the grid is attached to the metal ring.

16. The system of claim 15, wherein the periphery of the grid is attached to the metal ring such that the ring exerts tensile force on the grid.

17. The system of claim 15, wherein the insulating ring or the insulating spacers comprises a textured surface.

* * * * *